United States Patent
Tseng et al.

(10) Patent No.: US 7,463,816 B2
(45) Date of Patent: Dec. 9, 2008

(54) METHOD OF ENCODING AND DECODING PICTURED DATA FOR ENHANCING IMAGE RESOLUTION

(75) Inventors: Yung-Chao Tseng, Shindian (TW); Chun-Chia Su, Shindian (TW); Hochao Huang, Shindian (TW)

(73) Assignee: Cyberlink Corp., Shindian, Taipei (TW)

( * ) Notice: Subject to any disclaimer, the term of this patent is extended or adjusted under 35 U.S.C. 154(b) by 1008 days.

(21) Appl. No.: 10/667,079

(22) Filed: Sep. 18, 2003

(65) Prior Publication Data

US 2005/0063681 A1    Mar. 24, 2005

(51) Int. Cl.
*H01N 5/76* (2006.01)
*H01N 7/00* (2006.01)
*H01N 5/00* (2006.01)

(52) U.S. Cl. ............... 386/46; 386/125; 386/126; 386/105; 386/106

(58) Field of Classification Search ............ 386/46, 386/111, 125, 126; 382/299, 300
See application file for complete search history.

(56) References Cited

U.S. PATENT DOCUMENTS

| | | | | |
|---|---|---|---|---|
| 4,963,991 A | * | 10/1990 | Honjo | 386/27 |
| 5,430,486 A | * | 7/1995 | Fraser et al. | 348/426.1 |
| 5,483,296 A | * | 1/1996 | Nonweiler | 348/719 |
| 5,559,936 A | * | 9/1996 | Poulter et al. | 345/428 |
| 6,125,201 A | * | 9/2000 | Zador | 382/166 |
| 6,185,369 B1 | * | 2/2001 | Ko et al. | 386/125 |
| 6,285,804 B1 | * | 9/2001 | Crinon et al. | 382/299 |
| 6,363,119 B1 | * | 3/2002 | Oami | 375/240.03 |
| 6,415,101 B1 | * | 7/2002 | deCarmo et al. | 386/105 |
| 6,429,895 B1 | * | 8/2002 | Onuki | 348/208.99 |
| 6,573,819 B1 | * | 6/2003 | Oshima et al. | 386/111 |
| 6,633,725 B2 | * | 10/2003 | Hughes et al. | 386/123 |
| 6,728,477 B1 | * | 4/2004 | Watkins | 386/125 |
| 6,925,250 B1 | * | 8/2005 | Oshima et al. | 386/111 |
| 6,944,392 B1 | * | 9/2005 | De Bruijne | 386/125 |
| 7,024,102 B1 | * | 4/2006 | Inoshita et al. | 386/111 |
| 7,030,845 B2 | * | 4/2006 | Maa | 345/88 |
| 7,065,251 B2 | * | 6/2006 | Yadid-Pecht | 382/232 |

\* cited by examiner

*Primary Examiner*—Thai Tran
*Assistant Examiner*—Gelek Topgyal
(74) *Attorney, Agent, or Firm*—Thomas, Kayden, Horstemeyer & Risley

(57) ABSTRACT

The present invention is a method for enhancing image resolution. A high-resolution image is decomposed into plural primary image data with DVD/SVCD/VCD standard image resolution and then these plural primary image data are stored in plural user data format or secondary viewing angle data format of DVD/VCD/SVCD image data carrier. Next, the average value of pixels at the same positions of the plural primary image data is calculated and secondary image data are formed. Finally, the secondary image data are stored in a video-audio data format or a primary viewing angle data format of DVD/VCD/SVCD image data carrier. In order to play the high-resolution image data carrier, the plural primary image data is combined and restored to form a high-resolution image, hence achieving the goal of enhancing the image resolution of DVD/SVCD/VCD.

20 Claims, 5 Drawing Sheets

METHOD OF ENCODING AND DECODING PICTURED DATA FOR ENHANCING IMAGE RESOLUTION

FIELD OF INVENTION

The present invention is a method of encoding and decoding picture data for enhancing image resolution, and especially relates to a method that is used on DVD/VCD/SVCD for raising standard image resolution to at least twice the current standard resolution by using certain encoding and decoding technique.

DESCRIPTION OF PRIOR ART

In recent years, DVD (Digital Versatile Disc) has become the new optical storage medium with advantageous characteristics of large capacity and high quality output. Generally, a DVD with single-side double-layer disc structure and large storage capacity of 8.5 GB is used. By utilizing high picture quality image compression technique of MPEG-2, such a DVD can store up to more than eight hours of video data with 720×480 resolution. Besides the advantages of large capacity and good picture resolution, the DVD also has other benefits such as primary angle and plural secondary viewing angles, selection of different frame aspect ratios (4:3, 16:9), multi language/text support, maximum 8 audio sound tracks and 32 subtitle channels, and viewer's restriction.

However, VCD and SVCD are the most conventionally used video-audio optical media that use MPEG(-1 and MPEG-2) video compression technique. Generally speaking, a VCD can store about 74 minutes of video data with 352×240 resolution and an SVCD stores about 74 minutes of video data with 480×480 resolution. MPEG can also define a user data and has ability to compress data into an image data format.

SUMMARY OF THE INVENTION

DVD resolution (720×480) is the best of the present day video-audio optical media, but it still cannot completely satisfy some fastidious users as the computer screen resolution has conventionally reached 1024×768 and many digital TV manufactures are striving to develop and research higher resolution TV. Therefore, the demand for higher resolution image in traditional video-audio optical disc is rising.

Hence, as a result of research and development to raise present DVD/VCD/SVCD resolution, the present invention describes a method of enhancing image resolution that can break through the limitation on traditional video-audio disc. The method of the present invention not only provides a higher resolution image, but also can compatibly adapt to the present video-audio optical disc format without influencing or degrading the playback quality of the playback apparatus.

The present invention provides the following ways to achieve the purpose of raising image resolution on video-audio optical media:

According to one aspect of the present invention, a method for enhancing image resolution is provided for use on an image data carrier to store or playback a high-resolution image at no less than twice the conventional standard image resolution. The method firstly sets the image data carrier to a video-audio data format and plural user data format. Then it decomposes the high-resolution image into the plural primary image data that are in standard image resolution and stores these plural primary image data in the plural user data format of the image data carrier. A secondary image data is formed by calculating the average value of the pixels that are at the same positions on each plural primary image data. Finally, the secondary image data are stored in a video-audio format of the image data carrier, thus achieving the function of storing high-resolution image data in a conventional image data carrier.

According to another aspect of the present invention, an encoding apparatus for enhancing the image resolution is provided. The encoding apparatus consists of an image decomposing unit, an image operation unit, an image storage unit and an image-encoding unit. The image-decomposing unit reads a high-resolution image and decomposes it into plural primary image data with standard image resolution. The image operation unit calculates the average value of pixels that are at the same positions on each primary image data and forms a secondary image data. The image storage unit respectively stores the plural primary image data and the secondary image data into the user data format and video-audio data format of the image data carrier. Hence, the method achieves the goal of making an image data carrier that can store high-resolution image.

According to one other aspect of the present invention, a playback apparatus for enhancing image resolution is provided. The playback apparatus consists of a readout unit, an image combining unit and a decoding unit. The readout unit reads the image data of the plural user data format on the image data carrier. The image-combining unit accordingly acquires pixels at the same positions on each of the image for combining and restoring the high-resolution image. The decoding unit decodes the image data by adopting image compression technique and forms image data for playback. Thereby, the method achieves the function of playing back high-resolution image on image data carrier.

Additional objects and advantages of the invention will be set forth in description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The invention can be more fully understood by reading the following detailed description of the preferred embodiment, with reference made to the accompanying drawings as follows.

DESCRIPTION OF THE PREFERRED EMBODIMENT

Reference will now be made in detail to the present preferred embodiment of the invention, examples of which are illustrated in the accompany drawings.

Figure 1:
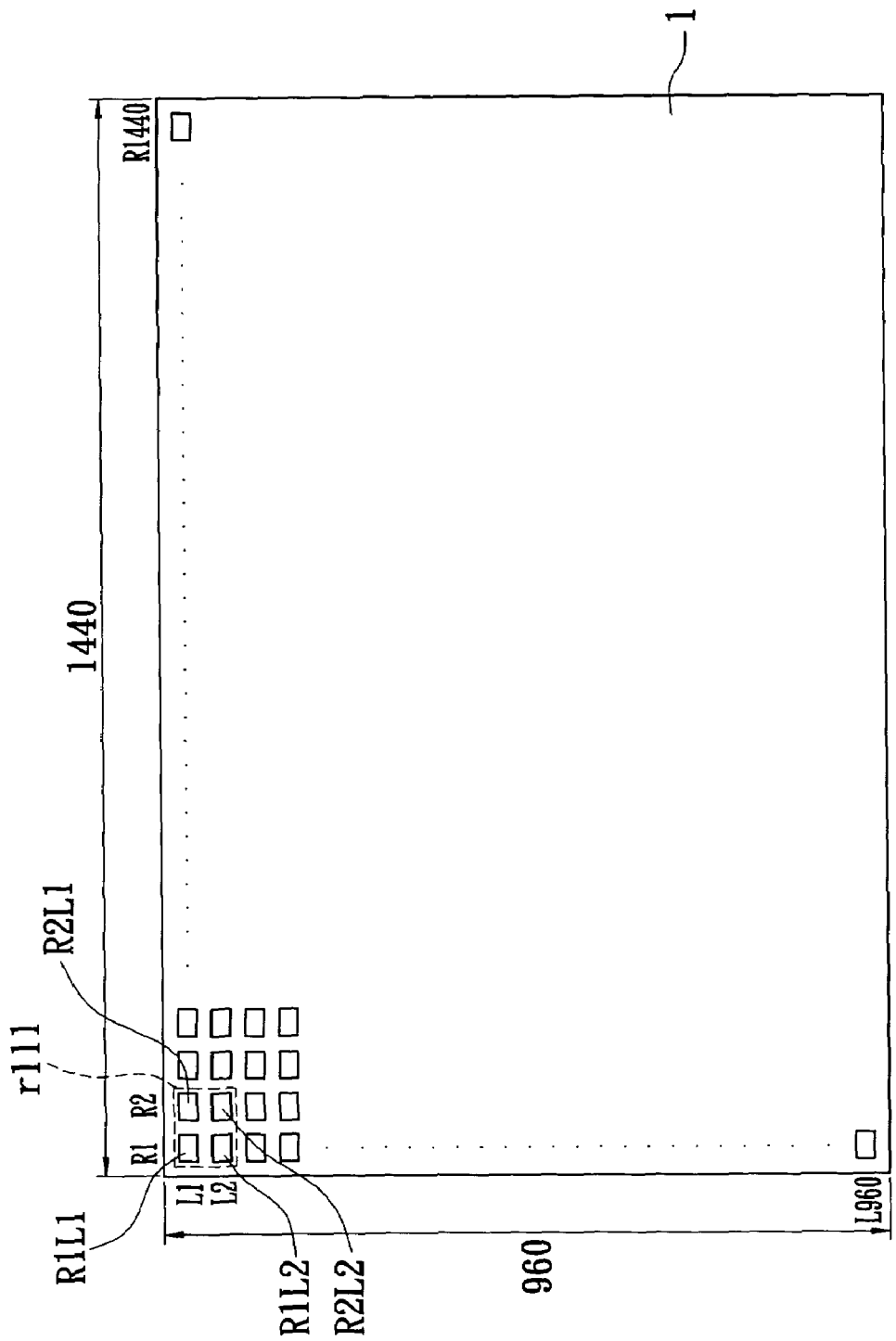
FIG. 1: a diagram of a high-resolution image.

The present invention takes DVD video-audio optical disc as a preferred embodiment for description. Reference is made to FIG. 1, a diagram of high-resolution image and FIG. 2, a diagram of four standard resolution DVD images decomposed from a high-resolution image. A standard DVD has a resolution of 720×480 pixels, which is defined by number of pixels in row verses number of pixels in column on a screen. In the following article an image from a DVD is denoted as a "standard resolution image" and hence, the high-resolution image 1 (e.g. 1440×960) is at least twice or more than the standard-resolution image. The preferred embodiment of the present invention decomposes the high-resolution image 1 into four standard-resolution images 2 and then stores each of these standard-resolution images in data format of different viewing angle on the DVD. In other words, the four standard-resolution images 2 are stored separately in data format of primary viewing angle, a first secondary viewing angle, a second secondary viewing angle and a third secondary viewing angle of the DVD. For the same reason, if the high-resolution image 1 is three times the standard-resolution image 2, it can be decomposed into nine standard-resolution images 2. The preferred embodiment of the present invention takes the twice standard-resolution image as an example for elaboration.

Figure 2:
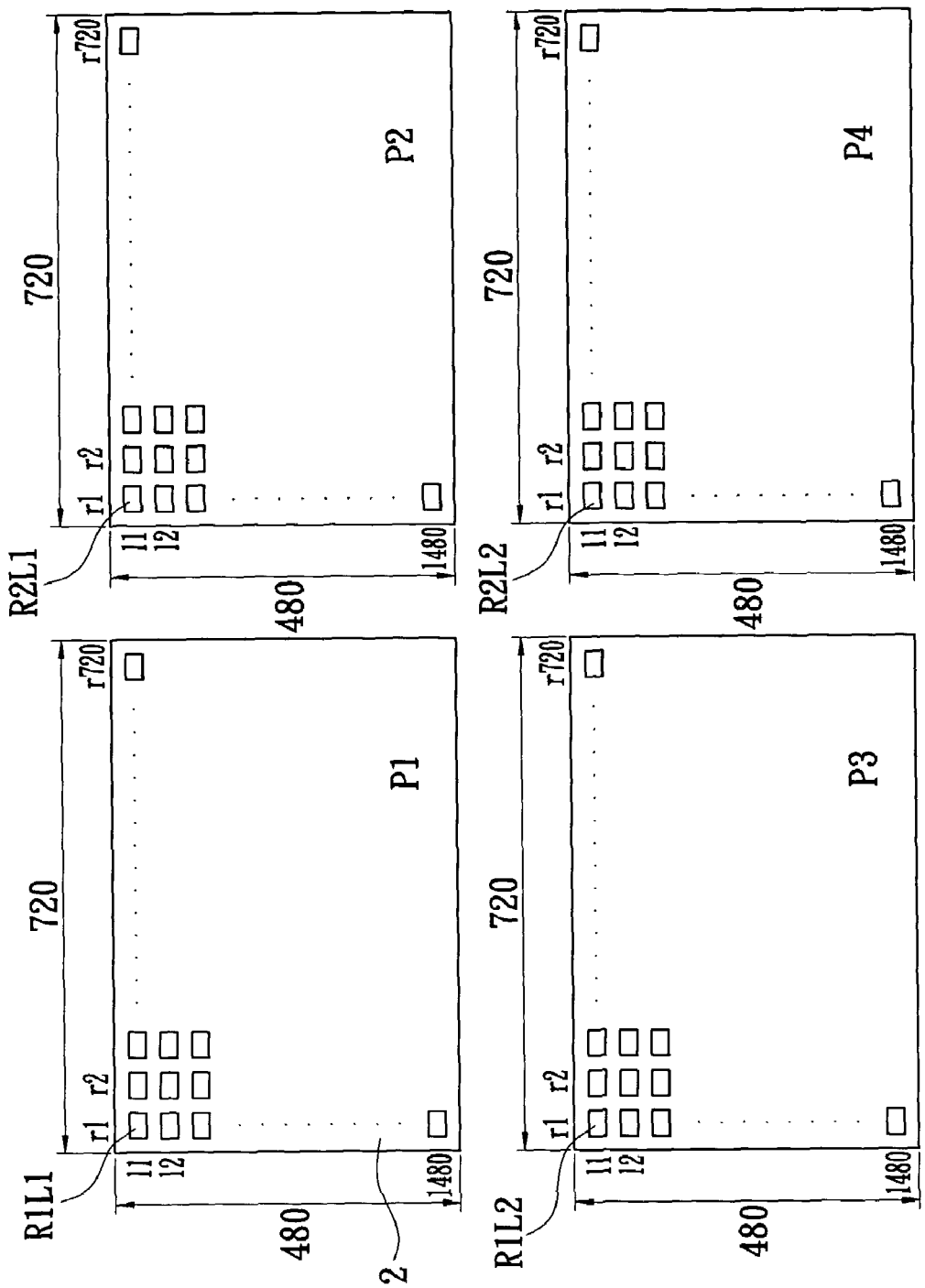
FIG. 2: a diagram of four standard resolution DVD images decomposed from a high-resolution image.
Figure 3:
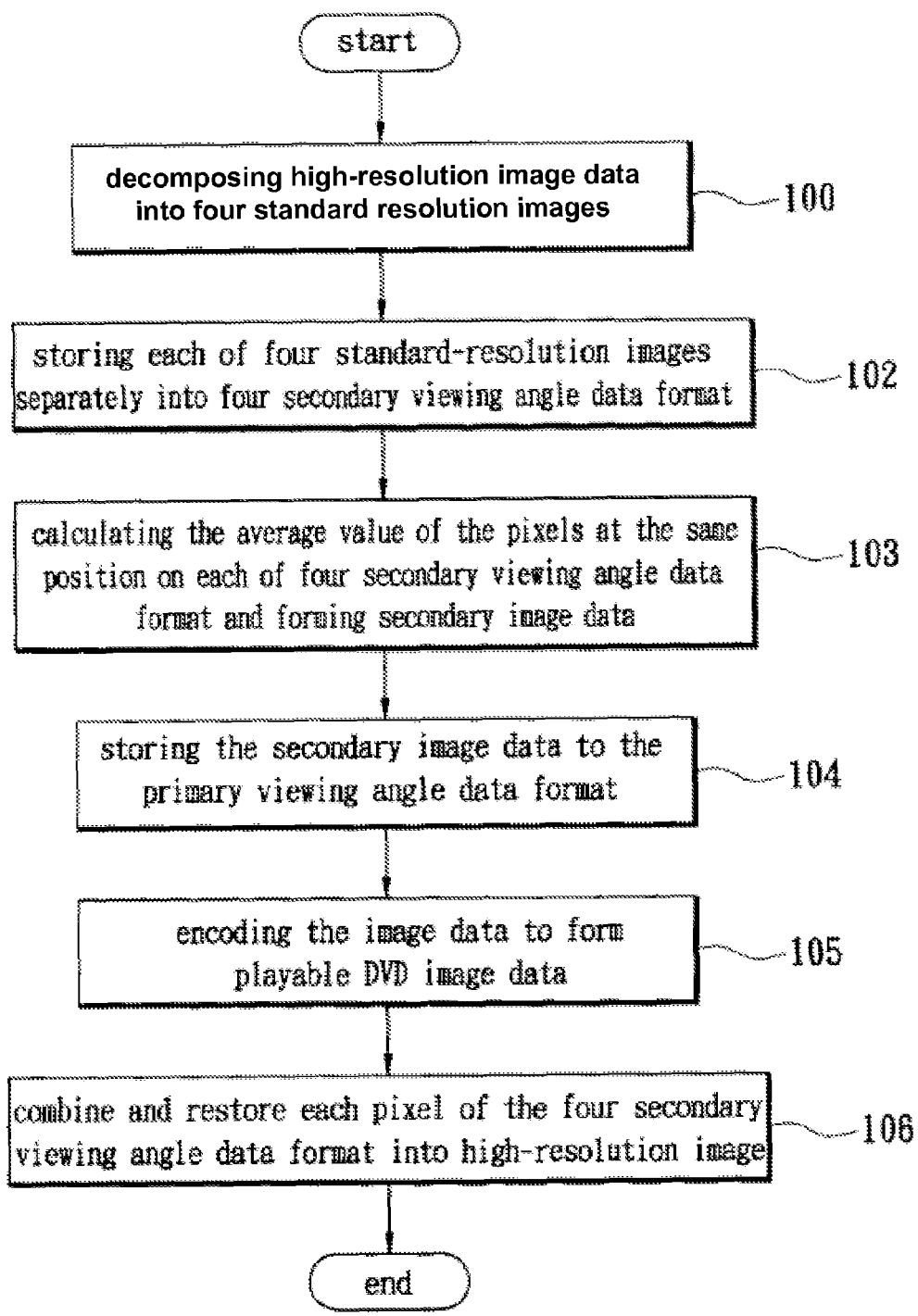
FIG. 3: a flow chart of the method for enhancing DVD image resolution in the present invention.

FIG. 3 illustrates a flow chart of the method for enhancing DVD image resolution in the present invention. If the high-resolution image is merely cut into four image segments of standard resolution images 2 and then played in a DVD drive, the primary viewing angle, the first secondary viewing angle, the second secondary viewing angle and the third secondary viewing angle of the DVD each can only display one-quarter (¼) of the full high-resolution image. Therefore, the present invention corresponds one pixel (r111) position of the four standard-resolution images to four pixel positions of the high-resolution image that are R1L1, R2L1, R1L2 and R2L2. As the FIG. 1 shows, the four adjacent pixels of the high-resolution image (R1L1, R2L1, R1L2 and R2L2) are evenly distributed to four separate pixels at the same position (r111) of each standard-resolution image data (P1, P2, P3 and P4). The result is shown in FIG. 2 as R1L1=P1: r111, R2L1=P2: r111, R1L2=P3: r111 and R2L2=P4: r111. According to this procedure of high-resolution image decomposition, the whole high-solution image 1 can be evenly distributed into image data of four standard resolution images 2 (step 100). The four standard-resolution images are then separately stored in image data format of one primary viewing angle and three secondary viewing angle of the DVD. In this way, every viewing angle is able to display a complete image and structurally compatible with the present DVD player.

However, when the DVD player plays back the high-resolution image 1, the image data from primary viewing angle appears to be brighter than other viewing angles. This could cause some discordance on picture qualities. Therefore, in order to overcome this problem, the present invention defines the four discomposed video images as four primary image data and stores each of them separately into secondary viewing angle data format 102. A secondary image data is then formed by calculating the average value of the pixels at the same positions on each of the primary image data 103. Taking the first pixel of each primary image data as an example, the average value P can be calculated using the formula P=(P1+P2+P3+P4)÷4 and then the value P is stored to the first pixel of the primary viewing angle 104. In this way, the problem of discordance between primary and secondary viewing angles can be solved.

Finally, the primary image data and secondary image data are encoded according to image compression technique (MPEG2) to form a playable DVD image data 105. Further, when playing the high-resolution image on the DVD of the present invention, the high-resolution image can be combined and restored back by accordingly acquiring each pixel at the same position on each primary image data of the four secondary viewing angles (106).

Because the maximum data reading and transmitting speed of the DVD player is 10.8 Mbps and the storage capacity limit is 8.5 Gbyte, it is not possible to infinitely raise the image resolution. Hence, one must control the DVD data transmission rate to under 10.8 Mbps and the storage capacity of high-resolution image should be under 8.5 G.

In order to resolve the issues of storage capacity and transmission speed, the present invention takes a pixel from a secondary viewing angle and subtracts the corresponding position pixel in the primary viewing angle and then stores the result back into the same pixel position of the secondary viewing angle. For example, the first pixel of the first secondary viewing angle is subtracted from the first pixel of the primary viewing angle the result stored back into the same position in the first secondary viewing angle. Due to the similarity of image data between the viewing angles, after they have been subtracted from each other, the result tends to be zero. In this way, the entire high-resolution image data can be decreased substantially to lower the storage space requirement. Furthermore, the data transmission speed is also enhanced due to the avoidance of transmitting repeated image data.

Figure 4:
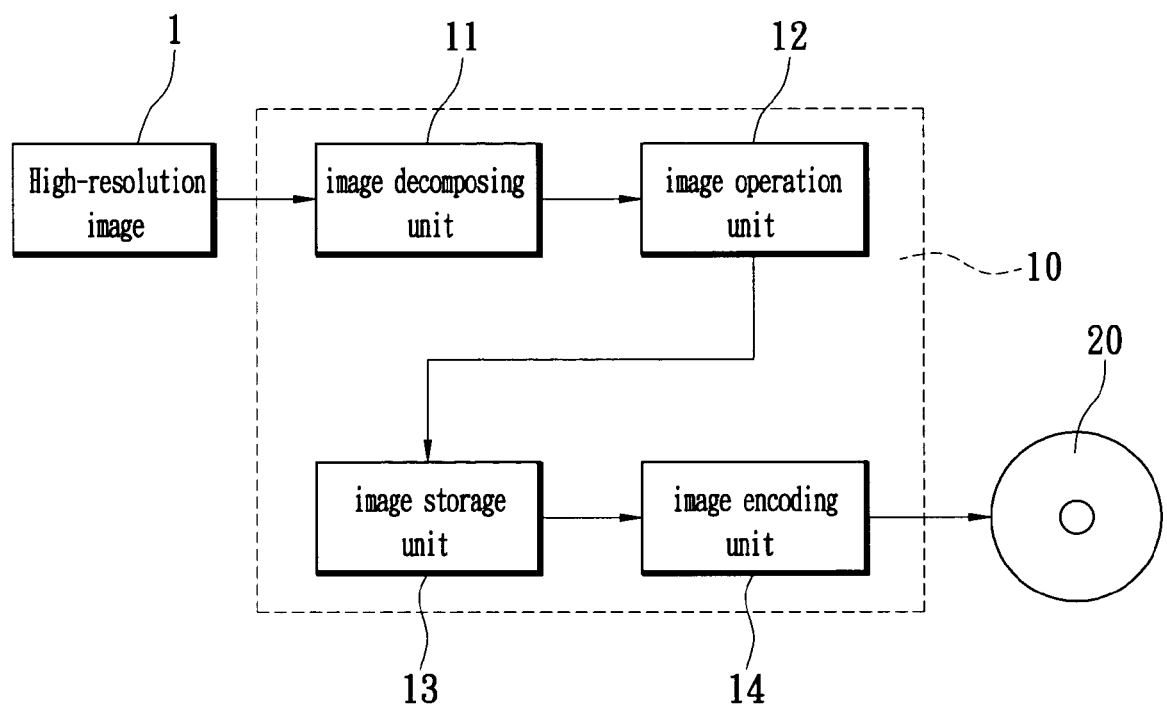
FIG. 4: a block diagram of the encoding apparatus for high-resolution image.

The present invention can be equally applied to video-audio optical disc of VCD and SVCD. The method uses the manner of the adjustable setting on user data format to decompose the high-resolution image into plural standard-resolution images of VCD or SVCD and then stores back the same into the user data format again. In this way, the resolution of VCD or SVCD can be at least raised to the resolution quality of DVD (720×480). However, the transmission speed of image data format and user data format should not exceed 1152 kbps for VCD and not exceed 2400 kbps for SVCD. Reference is made to FIG. 4, a block diagram of the encoding apparatus for high-resolution image. The main usage of the high-resolution image encoding apparatus 10 is to make the DVD image data carrier 20, which is loaded with high-resolution images 1. Thereby, the encoding apparatus 10 consists of at least an image decomposing unit 11, an image operation unit 12, an image storage unit 13 and an image encoding unit 14. The image-decomposing unit 11 reads the high-resolution image 1 and decomposes it into plural primary image data of standard-resolution. The image operation unit 12 then calculates the average value of the plural pixels at the same positions of each primary image data and forms a secondary image data.

Next, the image storage unit 13 respectively stores the plural primary and the secondary image data into a plural user data format and a video-audio data format of the DVD image data carrier. The image-encoding unit 14 encodes the primary and secondary image data into a playable video image of the DVD image data carrier by using MPEG1 or MPEG2 image compression techniques.

Figure 5:
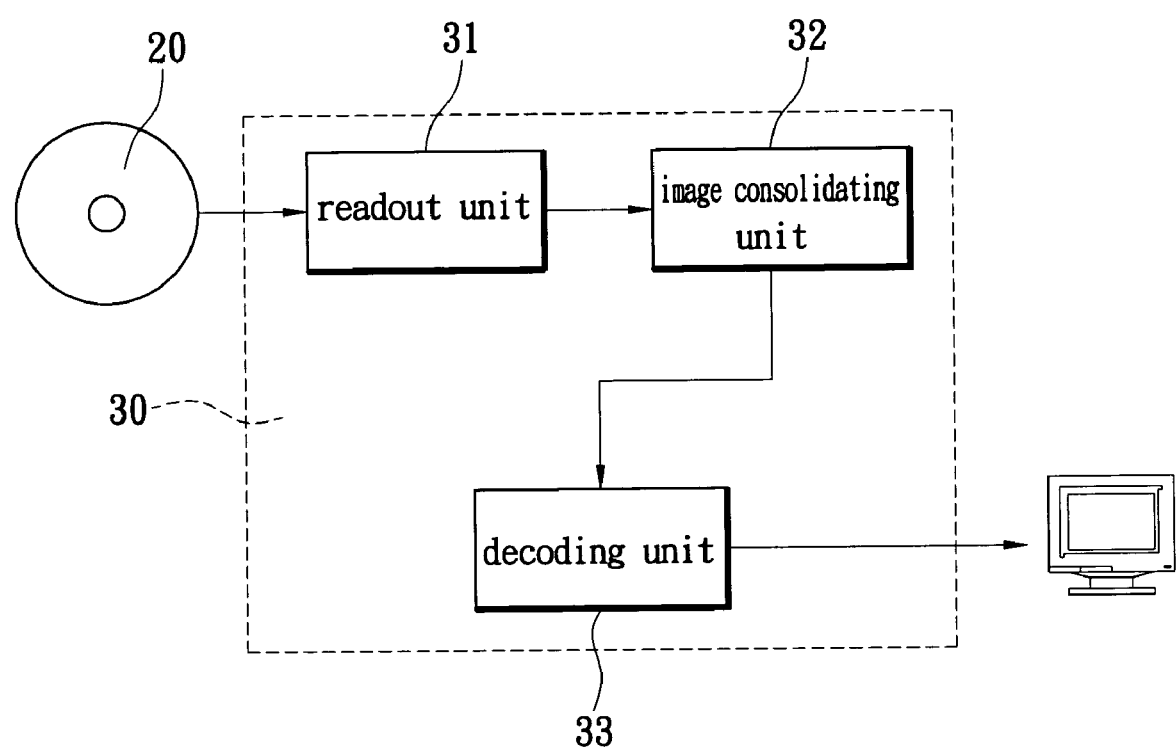
FIG. 5: a block diagram of playback apparatus for playing high-resolution image.

Reference is made to FIG. 5, a block diagram of playback apparatus for playing high-resolution image. The high-resolution image playback apparatus 30 is used mainly to play the high-resolution images that are recorded on the DVD image data carrier 20. The playback apparatus 30 comprises of a readout unit 31, an image combining unit 32 and a decoding unit 33. The readout unit 31 reads the image data from the plural viewing angles of the DVD image data carrier. The image-combining unit 32 accordingly acquires every pixel at the same position of each image data and combines them to restore the high-resolution data. Next, the decoding unit 33 decodes the image data using the image compression technique of MPEG2 and forms video image information for display.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intending to be embraced within the scope of the invention as defined in the appended claims.

While the preferred embodiment of the present invention has been illustrated and described, it will be appreciated that various changes can be made therein without departing from the spirit and scope of the invention.

What is claimed is:

1. A method for enhancing image resolution, wherein the method is applied to a high-resolution image data carrier for storing or playing a high-resolution image at least twice the standard image resolution, the method comprising the following steps:

defining a video-audio data format and a plurality of user data formats on the high-resolution image data carrier;
 evenly decomposing and distributing the plural image pixels of the high-resolution image, adjacent along a vertical direction or a horizontal screen on a screen, into corresponding plural pixels of primary image data of standard image resolution, wherein the corresponding plural pixels are located at a same pixel position;
 encoding at least one primary image data to form a disc playable image data;
 storing one set of the primary image data into the video-audio data format of the high-resolution image data carrier and storing another primary image data set separately into the plural of user data formats;
 playing back one set of the primary image data from the video-audio data format by any playback apparatus if low resolution is required; and
 combining one set of the primary image data from the video-audio data format and another primary image data from the user data formats to form a combined playable image data and playing back the combined playable image data by a specific playback apparatus if high resolution is required;
 wherein the specific playback apparatus comprises:
  a readout unit for reading out the plural user data formats on the high-resolution image data carrier; and
  an image-combining unit for acquiring the primary image data at a same position of the user data format to combine and restore the high-resolution image.

2. The method according to claim 1, wherein the image data carrier is a DVD medium with a resolution of 720×480.

3. The method according to claim 1, wherein the image data carrier is a VCD medium with a resolution of 352×240.

4. The method according to claim 1, wherein the image data carrier is an SVCD medium with a resolution of 480×480.

5. The method according to claim 1, wherein the video-audio data format is a primary viewing angle setting format of MPEG2 and the user data format is in a secondary viewing angle setting format.

6. The method according to claim 1, wherein the video-audio data format and the user data format are the video-audio data format and the user data format of MPEG1, respectively.

7. The method according to claim 1, wherein the image compression technique is MPEG1.

8. The method according to claim 1, wherein the image compression technique is MPEG2.

9. A method for enhancing the image resolution, wherein the method is applied to a high-resolution image data carrier for storing or playing a high-resolution image that is at least twice the standard resolution, the method comprising the following steps:

setting the high-resolution image data carrier to have a video-audio data format and plural user data format;
 decomposing the high-resolution image into plural primary image data of standard image resolution;
 storing the plural primary image data into the user data format;
 calculating an average of the pixels at the same positions in the plural primary image data for forming a secondary image data;
 encoding the secondary image data to form a disc playable image data;
 storing the secondary image data into the video-audio data format of the high-resolution image data carrier;
 playing back the secondary image data from the video-audio data format by any playback apparatus if standard resolution is required; and
 combining and restoring secondary image data from the video-audio data formats and another primary image data from the user data formats to form the high-resolution image and playable by a specific playback apparatus if high resolution is required;
 wherein the specific playback apparatus comprises:
  a readout unit for reading out the plural user data formats on the high-resolution image data carrier; and
  an image-combining unit for acquiring the secondary image data and the primary image data at a same position of the user data format to combine and restore the high-resolution image.

10. The method according to claim 9, wherein the image data carrier is a DVD medium with a standard-resolution of 720×480.

11. The method according to claim 9, wherein the image data carrier is a VCD medium with a standard-resolution of 352×240.

12. The method according to claim 9, wherein the image data carrier is an SVCD medium with a standard-resolution of 480×480.

13. The method according to claim 9, wherein the video-audio data format is a primary viewing angle format setting of MPEG2 and the user data format is a secondary viewing angle setting.

14. The method according to claim 9, wherein the video-audio data format and user data format are the video-audio data format and user data format of MPEG1, respectively.

15. The method according to claim 9, wherein the decomposing step comprises: evenly decomposing and distributing the plural image pixels in the adjacent vertical and horizontal arrangement of the high-resolution image evenly into the pixels at same positions of the plural primary image data.

16. The method according to claim 9, wherein the image compression method is MPEG1.

17. An apparatus for encoding picture data to enhance image resolution and storing the high-resolution image at least twice the standard image resolution to a image data carrier, the encoding apparatus comprising at least:

an image-decomposing unit, for reading out the high-resolution image and decomposing the high-resolution image into plural primary image data of standard image resolution;

an image operation unit, for calculating an average value of pixels at the same position from plural primary image data for forming secondary image data;

an image-encoding unit utilizing an image compression technique to encode the primary and secondary image data and form a playable image data;

an image storage unit, separately storing the plural primary image data into plural user data format of the image data carrier; and storing the secondary image data in a video-audio data format of the image data carrier;

an image-combining unit for acquiring the secondary image data from the video-audio data format and the primary image data from the user data format to form a combined playable image data; and a playing unit for playing back one set of the primary image data from the video-audio data format if low resolution is required and playing back the combined playable image data if high resolution is required.

18. The encoding apparatus according to claim 17, wherein the image data carrier is a DVD, VCD or SVCD medium.

19. The encoding apparatus according to claim 17, wherein the user data format is a secondary viewing angle data format of MPEG2 and the video-audio data format is a primary viewing angle data format.

20. The encoding apparatus according to claim 17, wherein the image compression technique utilized in image encoding unit is MPEG1 or MPEG2.

* * * * *